United States Patent Office.

GEORGE SANGER, OF BELOIT, WISCONSIN.

Letters Patent No. 92,653, dated July 13, 1869.

IMPROVED COMBINED SCOURING AND FULLING-SOAP.

The Schedule referred to in these Letters Patent and making part of the same.

*To all whom it may concern:*

Be it known that I, GEORGE SANGER, of Beloit, of Rock county, in the State of Wisconsin, have invented certain new and useful Improvements in the Composition and Manufacture of a Combined Scouring and Fulling-Soap, in about the proportions herein set forth; and I do hereby declare the following description is sufficient to enable any person skilled in the art or science to which it most nearly appertains to make and use my said invention or improvements, without further invention or experiment.

The nature of my invention and improvements consists in the combination and manufacture of the ingredients hereinafter named, and in about the proportions specified, for the purpose of making a combined scouring and fulling-soap, substantially as follows, to wit:

Into a steam soap-kettle put one thousand pounds of tallow, adding three barrels of good soap-making lye, at twelve per cent.; start steam, and continue boiling, and adding this lye, at the same strength, until it is thoroughly made into soap. Then add three pecks of salt, dissolved in water, as strong as you can make it in the pickle, and boil the whole for half an hour, which will separate the soap from the spent lye. Then stop steam, and let stand for two hours, when the soap will rise to the top of the lye. Then draw the spent lye from the soap, and add four barrels of good lye, at fifteen per cent. Then start steam, and add fifteen hundred pounds of resin, and keep boiling and adding lye of the same strength, until the resin is thoroughly made into soap. Then add two bushels of salt, dissolved in water, and boil for three hours, which will again separate the soap from the spent lye. Then stop steam, and let stand for twelve hours. Then draw the spent lye from the soap, and add four barrels of lye, at seventeen per cent. Then start steam, and keep boiling and adding the lye of same strength, until the soap is very strong. Then add one bushel of salt, dissolved in water. Then boil for three hours, and stop steam, and let stand for fifteen hours. This is finished in the lye. Then dip off into large boxes, and add the ingredients below named, and keep stirring, until it becomes quite stiff, to wit: As above, add five hundred pounds of English or American (soap) clay, mixed with lye, at ten per cent.; four hundred and twenty-five pounds of sal-soda; forty-eight pounds ammonia; seventy pounds of wheat flour; twenty pounds of plaster of Paris; and one gallon of spirits of turpentine.

What I claim as my invention and improvements, and desire to secure by Letters Patent, is—

The combined scouring and fulling-soap, consisting of the above-enumerated ingredients, in about the proportions specified, and prepared substantially in the manner herein described and set forth.

GEORGE SANGER.

Witnesses:
H. P. JOHNSON,
R. F. DUTTON.